(12) United States Patent
Matsuda et al.

(10) Patent No.: US 8,999,587 B2
(45) Date of Patent: Apr. 7, 2015

(54) LITHIUM-ION SECONDARY BATTERY, VEHICLE, ELECTRONIC DEVICE AND MANUFACTURING METHOD OF LITHIUM-ION SECONDARY BATTERY

(75) Inventors: Takeshi Matsuda, Tokyo (JP); Masakazu Sanada, Kyoto (JP); Kenta Hiramatsu, Kyoto (JP); Kiyoshi Kanamura, Tokyo (JP)

(73) Assignee: SCREEN Holdings Co., Ltd. (JP)

( * ) Notice: Subject to any disclaimer, the term of this patent is extended or adjusted under 35 U.S.C. 154(b) by 799 days.

(21) Appl. No.: 13/220,244

(22) Filed: Aug. 29, 2011

(65) Prior Publication Data
US 2012/0077093 A1    Mar. 29, 2012

(30) Foreign Application Priority Data
Sep. 28, 2010 (JP) ................... 2010-217321

(51) Int. Cl.
*H01M 10/056* (2010.01)
*H01M 10/0585* (2010.01)
*H01M 10/04* (2006.01)
*H01M 10/0525* (2010.01)
*H01M 4/04* (2006.01)
*H01M 4/131* (2010.01)
*H01M 4/1391* (2010.01)
*H01M 4/485* (2010.01)
(Continued)

(52) U.S. Cl.
CPC ........ *H01M 10/0525* (2013.01); *H01M 4/0404* (2013.01); *H01M 4/0411* (2013.01); *H01M 4/131* (2013.01); *H01M 4/1391* (2013.01); *H01M 4/485* (2013.01); *H01M 4/525* (2013.01); *H01M 10/0565* (2013.01); *H01M 10/425* (2013.01); *H01M 2004/025* (2013.01); *H01M 2004/027* (2013.01); *Y02T 10/7011* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,152,971 A | 11/2000 | Miyanowaki et al. | ........ 29/623.5 |
| 6,316,145 B1 | 11/2001 | Kida et al. | |

(Continued)

FOREIGN PATENT DOCUMENTS

| | | |
|---|---|---|
| CN | 1674324 A | 9/2005 |
| CN | 1773650 A | 5/2006 |

(Continued)

OTHER PUBLICATIONS

Office Action dated Mar. 5, 2013 for counterpart Korean Application No. 10-2011-0044537.
(Continued)

*Primary Examiner* — Karie O'Neill Apicella
(74) *Attorney, Agent, or Firm* — Ostrolenk Faber LLP (57) ABSTRACT

A negative-electrode active material layer 12 contains $Li_4Ti_5O_{12}$ as a negative-electrode active material, and a positive-electrode active material layer 14 contains $LiCoO_2$ as a positive-electrode active material. A solid electrolyte layer 13 contains polyethylene oxide and polystyrene as an electrolyte material. Gradients of surfaces of stripe-shaped pattern elements 121 forming the negative-electrode active material layer 12 are smaller than 90° when viewed from a surface of the negative-electrode current collector 11. By such a construction, it is possible to construct a battery having a high capacity in relation to the used amount of the active materials and good charge and discharge characteristics.

11 Claims, 9 Drawing Sheets

(51) Int. Cl.
*H01M 10/0565* (2010.01)
*H01M 10/42* (2006.01)
*H01M 4/525* (2010.01)
*H01M 4/02* (2006.01)

(56) References Cited

U.S. PATENT DOCUMENTS

| | | | |
|---|---|---|---|
| 6,511,776 B1 | 1/2003 | Ohshita et al. | 429/303 |
| 2005/0214647 A1 | 9/2005 | Tanaka et al. | |
| 2006/0099535 A1 | 5/2006 | Yabe | 430/322 |
| 2007/0172735 A1* | 7/2007 | Hall et al. | 429/233 |
| 2007/0196735 A1* | 8/2007 | Takeuchi et al. | 429/231.1 |
| 2008/0102359 A1 | 5/2008 | Kogetsu et al. | 429/129 |
| 2011/0070479 A1 | 3/2011 | Matsuda et al. | 429/162 |
| 2011/0300440 A1 | 12/2011 | Matsuda et al. | 429/209 |
| 2012/0015253 A1 | 1/2012 | Matsuda et al. | 429/233 |

FOREIGN PATENT DOCUMENTS

| | | |
|---|---|---|
| CN | 101136466 A | 3/2008 |
| CN | 102280611 A | 12/2011 |
| JP | 59-094379 | 5/1984 |
| JP | 10-144301 | 5/1998 |
| JP | 10-312826 | 11/1998 |
| JP | 2000-277148 | 10/2000 |
| JP | 2002-279974 | 9/2002 |
| JP | 2005-116248 | 4/2005 |
| JP | 2005-135598 | 5/2005 |
| JP | 2005-525674 | 8/2005 |
| JP | 2006-138911 | 6/2006 |
| JP | 2008-053125 | 3/2008 |
| JP | 2009-545845 | 12/2009 |
| JP | 2010-528424 | 8/2010 |
| JP | 2011-198596 | 10/2011 |
| JP | 2012-22827 A | 2/2012 |
| JP | 2012-064488 | 3/2012 |
| WO | WO 03/012908 | 2/2003 |
| WO | WO 2008/015593 | 2/2008 |
| WO | WO 2008/153749 | 12/2008 |

OTHER PUBLICATIONS

Chinese Office Action issued Mar. 24, 2014 for corresponding Chinese Patent Application No. 201110135664.5 (5 pages).
Taiwanese Office Action issued Aug. 13, 2013 for corresponding Taiwanese Patent Application No. 100115801 (5 pages).
Japanese Office Action issued Oct. 8, 2013 for corresponding Japanese Patent Application No. 2010-217321 (3 pages).
Chinese Office Action issued Oct. 18, 2013 for corresponding Chinese Patent Application No. 201110135664.5 (5 pages).
Japanese Notice of Allowance issued Jan. 7, 2014 for corresponding Japanese Patent Application No. 2010-217321 (3 pages).

* cited by examiner

FIG. 5A    PRESENT EMBODIMENT

FIG. 5B    COMPARATIVE EXAMPLE

FIG. 6A    PRESENT EMBODIMENT

FIG. 6B    COMPARATIVE EXAMPLE

FIG. 7A  PRESENT EMBODIMENT

FIG. 7B  COMPARATIVE EXAMPLE 1

FIG. 7C  COMPARATIVE EXAMPLE 2

LITHIUM-ION SECONDARY BATTERY, VEHICLE, ELECTRONIC DEVICE AND MANUFACTURING METHOD OF LITHIUM-ION SECONDARY BATTERY

CROSS REFERENCE TO RELATED APPLICATION

The disclosure of Japanese Patent Application No. 2010-217321 filed on Sep. 28, 2010 including specification, drawings and claims is incorporated herein by reference in its entirety.

BACKGROUND OF THE INVENTION

1. Technical Field

This invention relates to a lithium-ion secondary battery in which an electrolyte layer is interposed between positive-electrode and negative-electrode active materials, a vehicle and an electronic device including this battery, and a method of manufacturing this battery.

2. Description of the Related Art

A battery in which metal foils as current collectors respectively having a positive-electrode active material or a negative-electrode active material deposited thereon are laminated via a separator and the separator is impregnated with an electrolytic solution is known as a battery, a lithium ion secondary battery for instance, having such a structure that an electrolyte layer is laminated between positive-electrode and negative-electrode active materials. In the technical filed of batteries of this type, further miniaturization and higher output are required and various technologies have been and are being proposed to meet such a requirement.

For example, JP2005-116248A discloses a technology for forming and laminating respective functional layers on a metal foil, which will become a current collector, by an ink-jet method in such a manner that contact surfaces of a positive-electrode active material layer and an electrolyte layer and contact surfaces of the electrolyte layer and a negative-electrode active material layer have a three-dimensional uneven structure. Further, JP2002-279974A discloses a structure in which column-shaped active material thin films are deposited as secondary battery electrodes on a current collector surface by vacuum deposition or sputtering via a mesh arranged above the current collector.

However, above-mentioned literatures disclose a possibility of manufacturing a battery having a three-dimensional structure, but a process for manufacturing a battery having a desired structure is complicated. Further, properties (electrochemical properties) of the manufactured battery are not disclosed in detail. As just described, a specific structure of a battery which has good electrochemical properties and can be manufactured with excellent productivity and a method for manufacturing such a battery have not been put to practical use thus far.

SUMMARY OF THE INVENTION

In view of the above problems, an object of this invention is to provide a lithium-ion secondary battery having a small size and good electrochemical properties and a technology for manufacturing such a battery with excellent productivity.

To achieve the above object, a lithium-ion secondary battery of the present invention comprises: a negative-electrode current collector layer; a negative-electrode active material layer containing $Li_4Ti_5O_{12}$ as an active material; a solid electrolyte layer containing polyethylene oxide and polystyrene; a positive-electrode active material layer containing $LiCoO_2$ as an active material; and a positive-electrode current collector layer, these being successively laminated, wherein, the negative-electrode active material layer has a striped structure made up of a plurality of stripe-shaped pattern elements parallel to each other and arranged on a surface of the negative-electrode current collector layer while being spaced apart, and an angle at a side including the negative-electrode active material layer out of angles formed between the surface of the negative-electrode current collector layer and a tangent drawn to the negative-electrode active material layer at a contact point of each stripe-shaped pattern element and the negative-electrode current collector layer is smaller than 90°.

Although described in detail later, a lithium-ion secondary battery having the structure as described above can be manufactured with a relatively small number of manufacturing steps and has good electrochemical properties despite its small and thin size according to a new knowledge obtained by the inventors of this application. Specifically, the lithium-ion secondary battery according to this invention has a high capacity and good charge and discharge characteristics.

There are various fields of application for the lithium-ion secondary battery having the above structure. For example, the battery can be applied as a power supply for various vehicles such as electric vehicles and can be applied to various electronic devices including a circuit unit which operates using this battery as a power supply.

To achieve the above object, a manufacturing method of a lithium-ion secondary battery of the present invention comprises: a first step of forming a negative-electrode active material layer having a striped structure made up of a plurality of stripe-shaped pattern elements containing $Li_4Ti_5O_{12}$ as a negative-electrode active material and parallel to and spaced apart from each other on a surface of a base material which will become a negative-electrode current collector layer; a second step of forming a solid electrolyte layer which is made of a solid electrolyte containing polyethylene oxide and polystyrene and covers both surfaces of the negative-electrode active material layer and exposed surfaces of the base material not covered by the negative-electrode active material layer; and a third step of laminating a positive-electrode active material layer containing $LiCoO_2$ as a positive-electrode active material and a positive-electrode current collector layer on a surface of the solid electrolyte layer, wherein, in the first step, an angle at a side including the negative-electrode active material layer out of angles formed between the surface of the negative-electrode current collector layer and a tangent drawn to the negative-electrode active material layer at a contact point of each stripe-shaped pattern element and the negative-electrode current collector layer is set smaller than 90°.

In the invention thus constructed, a lithium-ion secondary battery having the above striped structure and good properties can be manufactured with excellent productivity by appropriately controlling the cross-sectional shape of each stripe-shaped pattern element constituting the negative-electrode active material layer. Further, the lithium-ion secondary battery manufactured by such a manufacturing method has a small and thin size and good electrical prosperities as described above.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1A:
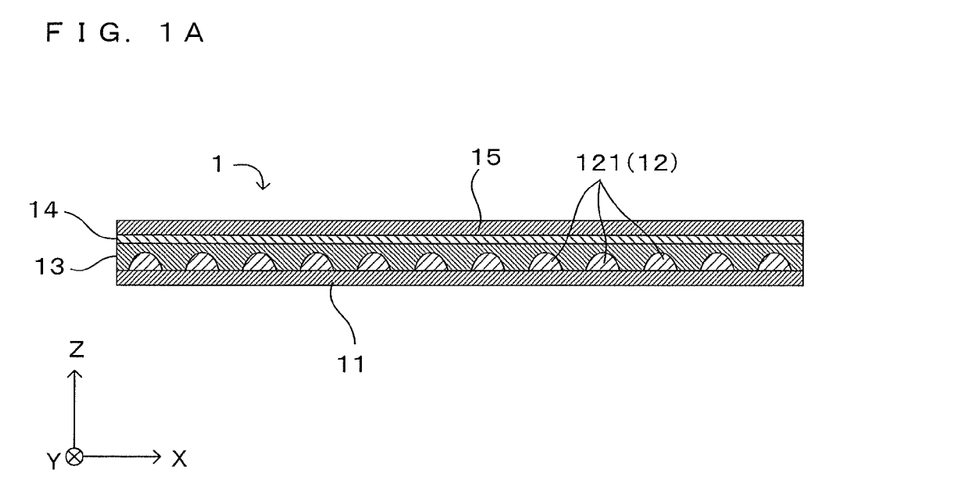
FIG. 1A is a drawing which shows a cross-sectional structure of a lithium-ion secondary battery as one embodiment of a battery according to the invention.
Figure 1B:
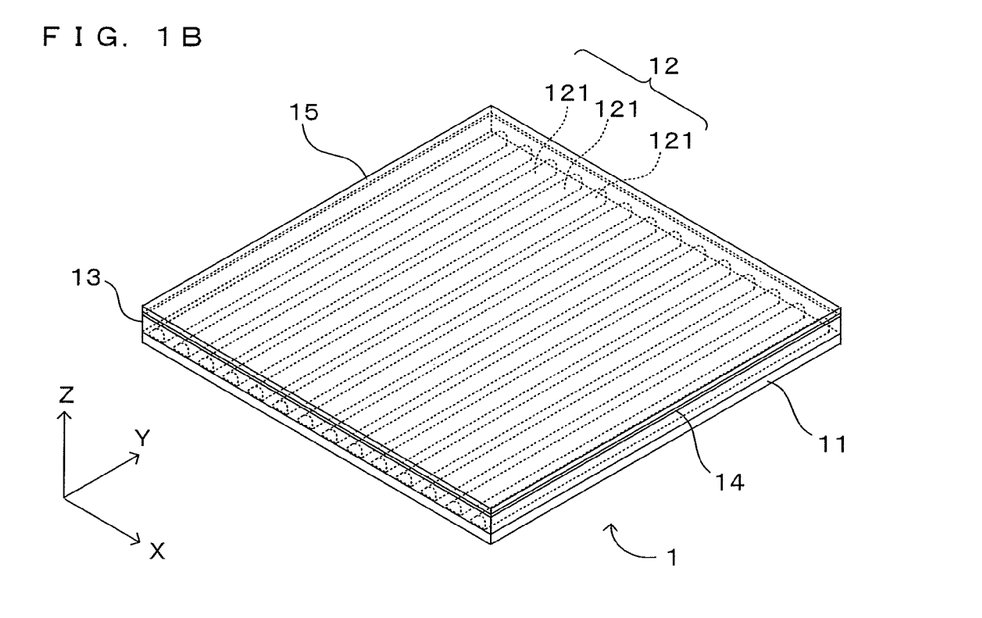
FIG. 1B is a perspective view of this battery.

FIG. 1A is a drawing which shows a cross-sectional structure of a lithium-ion secondary battery as one embodiment of a battery according to the invention. FIG. 1B is a perspective view of this battery. This lithium-ion secondary battery module 1 has such a structure that a negative-electrode active material layer 12, a solid electrolyte layer 13, a positive-electrode active material layer 14 and a positive-electrode current collector 15 are successively laminated on a surface of a negative-electrode current collector 11. In this specification, X-, Y- and Z-coordinate directions are respectively defined as shown in FIG. 1A.

As shown in FIG. 1B, the negative-electrode active material layer 12 has a line-and-space structure (striped structure) in which a multitude of stripe-shaped pattern elements 121 formed by a negative-electrode active material and extending in a Y-direction are arranged at regular intervals in an X-direction. On the other hand, the solid electrolyte layer 13 is formed by a solid electrolyte. The lower surface of the solid electrolyte layer 13 has an uneven structure in conformity with the unevenness on the upper surface of the negative-electrode active material layer 12, whereas the upper surface thereof is a substantially flat surface.

The positive-electrode current collector 15 is laminated on the upper surface of the positive-electrode active material layer 14 formed to be substantially flat in this way, whereby the lithium-ion secondary battery module 1 is formed. A lithium-ion secondary battery is formed by appropriately arranging tab electrodes or laminating a plurality of modules on this lithium-ion secondary battery module 1.

Here, a copper foil and an aluminum foil can be respectively used as the negative-electrode current collector 11 and the positive-electrode current collector 15. Further, a material mainly containing $LiCoO_2$ (LCO) can be, for example, used as a positive-electrode active material and a material mainly containing $Li_4Ti_5O_{12}$ (LTO) can be, for example, used as a negative-electrode active material. Furthermore, polyethylene oxide and polystyrene can be, for example, used as the solid electrolyte layer 13.

The lithium-ion secondary battery module 1 having such a composition and structure is thin and flexible. Since the negative-electrode active material layer 12 is formed to have an uneven space structure as shown and, thereby, increase its surface area with respect to its volume, an area facing the positive-electrode active material layer 14 via the thin solid electrolyte layer 13 can be increased to ensure high efficiency and high output. In this way, the lithium-ion secondary battery having the above structure can be small in size and have high performance.

Next, a method for manufacturing the above lithium-ion secondary battery module 1 is described. Conventionally, a module of this type has been formed by laminating thin film materials corresponding to respective functional layers, but there is a limit in increasing the density of the module by this manufacturing method. Further, with the manufacturing method disclosed in the literature described above, production takes time due to many operation steps and it is difficult to separate the respective functional layers. In contrast, with the manufacturing method described below, the lithium-ion secondary battery module 1 having the above structure can be produced with a smaller number of operation steps using an existing processing apparatus.

Figure 2:
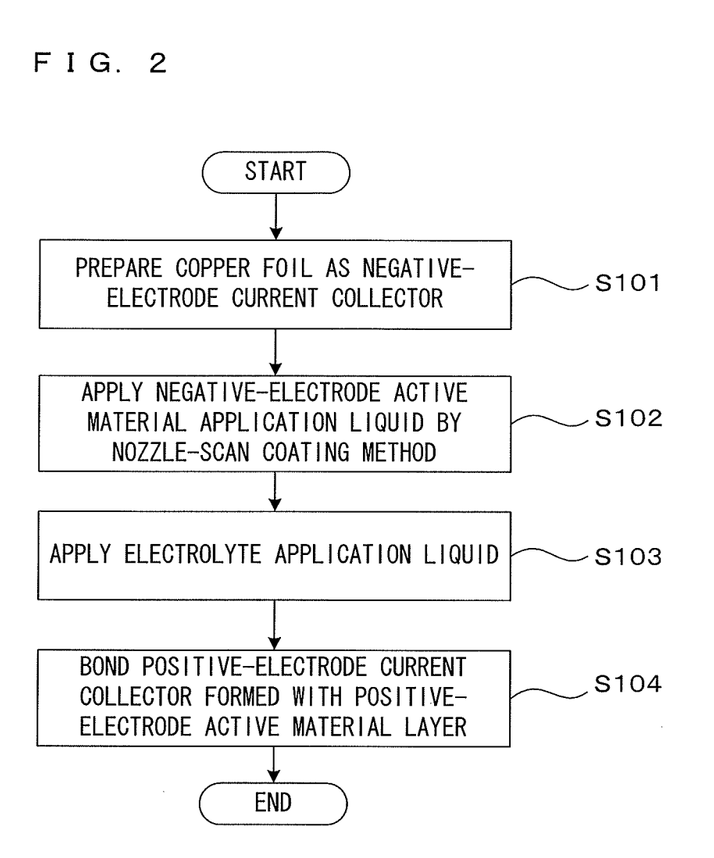
FIG. 2 is a flow chart which shows an example of a method for manufacturing the battery of FIG. 1A.

FIG. 2 is a flow chart which shows an example of a method for manufacturing the battery of FIG. 1A. In this manufacturing method, a metal foil, e.g. a copper foil, which will become the negative-electrode current collector 11, is first prepared (Step S101). In the case of using a thin copper foil, it is difficult to transport and handle this foil. Accordingly, it is preferable to improve transportability, for example, by attaching one surface of the copper foil to a carrier such as a glass plate or a resin sheet.

Subsequently, an application liquid containing a negative-electrode active material is applied to one surface of the copper foil by a nozzle dispensing method, in particular, by a nozzle-scan coating method for relatively moving a nozzle for dispensing the application liquid with respect to an application target surface (Step S102). An organic LTO material containing the negative-electrode active material described above can be, for example, used as the application liquid. A mixture of the above negative-electrode active material, acetylene black or ketjen black as a conduction aid, polyvinylidene fluoride (PVDF), styrene butadiene rubber (SBR), polyvinyl pyrrolidone (PVP), polyvinyl alcohol (PVA) or polytetrafluoroethylene (PTFE) as a binder, N-methyl-2-pyrrolidone (NMP) as a solvent and the like can be used as the application liquid. Note that a composition ratio LTO:AB:PVDF was approximately set at 8:1:1 in an application liquid used for a prototype of the embodiment to be described later.

Figure 3A:
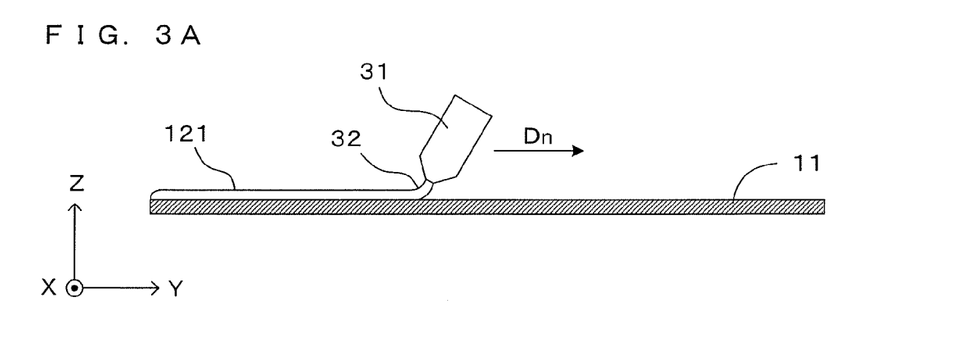
FIG. 3A is a drawing which shows a state of application by the nozzle-scan coating method when viewed in the X-direction.
Figure 3B:
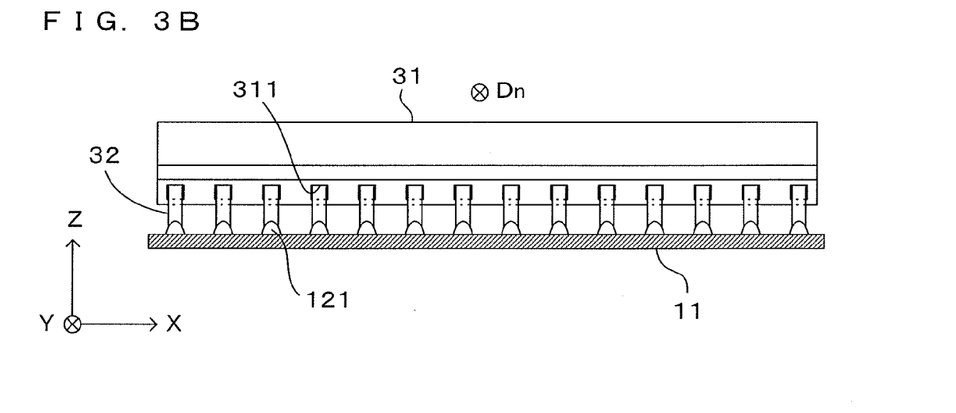
FIGS. 3B and 3C are drawings showing the same state when viewed in the Y-direction and from a diagonal upper side.
Figure 3C:
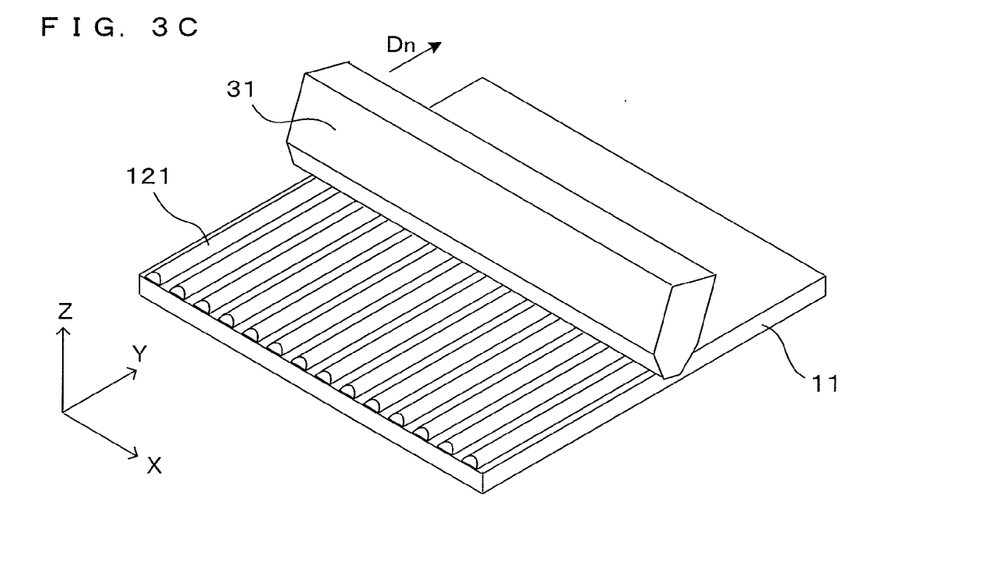

FIG. 3A is a drawing which shows a state of application by the nozzle-scan coating method when viewed in the X-direction, and FIGS. 3B and 3C are drawings showing the same state when viewed in the Y-direction and from a diagonal upper side. A technology for applying an application liquid to a base material by the nozzle-scan coating method is known and such a known technology can be applied also in this method, wherefore an apparatus construction is not described.

In the nozzle-scan coating method, a nozzle 31 perforated with one or more dispense openings 311 for dispensing the above organic LTO material as the application liquid is arranged above a copper foil 11. The nozzle 31 is relatively moved at a constant speed in an arrow direction Dn with respect to the copper foil 11 while dispensing a fixed amount of an application liquid 32 from the dispense opening(s) 311. By doing so, the application liquid 32 is applied on the copper foil 11 in a stripe extending in the Y-direction. By providing the nozzle 31 with a plurality of dispense openings 311, a plurality of stripes can be formed by one movement. By repeating this movement according to need, the application liquid can be applied in stripes on the entire surface of the copper foil 11. By drying and curing the application liquid, the stripe-shaped pattern elements 121 by the negative-electrode active material are formed on the upper surface of the copper foil 11. Heating may be applied after application to promote drying or a photo-curable resin may be added to the application liquid and the application liquid may be cured by light irradiation after application.

At this point of time, an active material layer 12 is partly raised on the substantially flat surface of the copper foil 11. Thus, as compared with the case where the application liquid is simply applied to have a flat upper surface, a surface area can be increased with respect to the used amount of the active material. Therefore, the area facing a positive-electrode active material layer to be formed later can be increased to ensure a high output.

The flow chart of FIG. 2 is further described. An electrolyte application liquid is applied on the upper surface of a laminated body, which is formed by laminating the negative-electrode active material layer 12 on the copper foil 11, by an appropriate coating method, e.g. a knife coating method or a bar coating method (Step S103). As the electrolyte application liquid, a mixture of a resin as the above polymer electrolyte material such as polyethylene oxide and polystyrene, a supporting salt such as $LiPF_6$ (lithium hexafluorophosphate) and a solvent such as diethylene carbonate can be used. The coating method is not limited above and known coating methods capable of forming a substantially flat surface can be appropriately employed as the coating method.

Subsequently, the positive-electrode active material layer 14 and an aluminum foil 15 as the positive-electrode current collector are laminated. An example of such laminating method is described. In advance, the positive-electrode active material layer 14 is formed on the aluminum foil 15 as the positive-electrode current collector by coating an application liquid containing a positive-electrode active material uniformly on the surface of the aluminum foil 15. An aqueous LCO material obtained by mixing the positive-electrode active material, acetylene black as a conduction aid, SBR as a binder, carboxymethylcellulose (CMC) as a dispersant and pure water as a solvent can be, for example, used as the application liquid containing the positive-electrode active material. Known coating methods capable of forming a flat film on a flat surface such as a knife coating method, a bar coating method and a spin coating method can be appropriately employed as the coating method.

Before the electrolyte application liquid applied in Step S103 is cured, the aluminum foil 15 formed with the positive-electrode active material layer 14 is bonded to tightly attach the positive-electrode active material layer 14 and the electrolyte application liquid (Step S104). At this time, to further increase adhesion, the electrolyte application liquid may be also applied on the positive-electrode active material layer 14 on the surface of the aluminum foil 15.

By doing so, the lithium-ion secondary battery module 1 in which the negative-electrode current collector 11, the negative-electrode active material layer 12, the solid electrolyte layer 13, the positive-electrode active material layer 14 and the positive-electrode current collector 15 are successively laminated is formed. Besides the above method, for example, an application liquid containing a negative-electrode active material may be applied and then the positive-electrode current collector 15 may be bonded after the solid electrolyte layer 13 is formed by applying the electrolyte application liquid and curing it.

Figure 4:
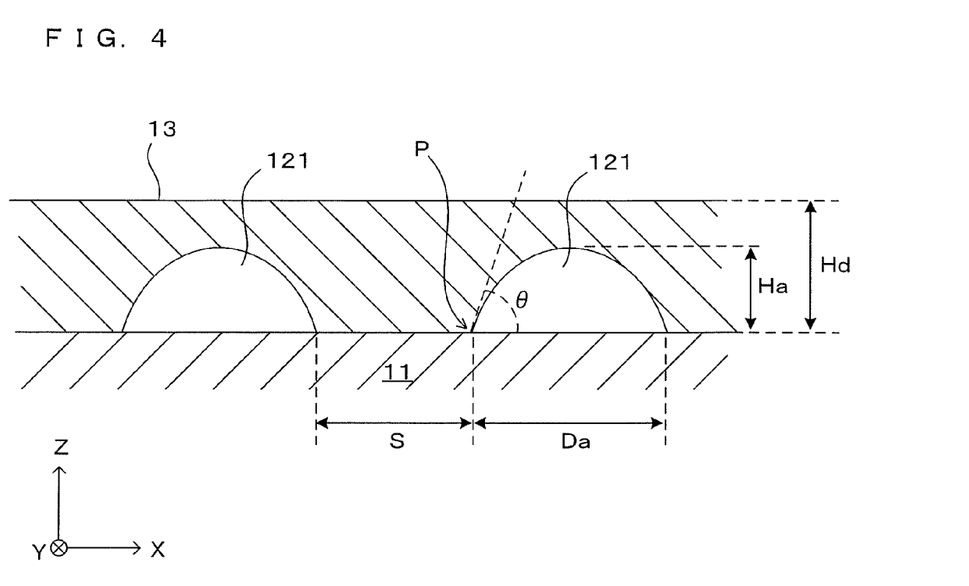
FIG. 4 is an enlarged sectional view which shows a cross-sectional shape of the negative-electrode active material layer.

Next, the structure of the negative-electrode active material layer in the lithium-ion secondary battery module 1 is described in more detail with reference to FIGS. 4 to 7C. FIG. 4 is an enlarged sectional view which shows a cross-sectional shape of the negative-electrode active material layer. FIGS. 5A, 5B, 6A and 6B are graphs which show actual measurement data on properties of the battery of this embodiment. FIGS. 7A, 7B and 7C are drawings which diagrammatically show a difference between the structure of the battery according to the invention and that of a conventional battery module.

As shown in FIG. 1B, the negative-electrode active material layer 12 in this embodiment has an island structure in which a plurality of stripe-shaped pattern elements 121 extending in the Y direction are separated from each other in the X-direction. FIG. 4 shows a cross section of the stripe-shaped pattern elements 121 cut along an X-Z plane. As shown in FIG. 4, the surfaces of the stripe-shaped pattern elements 121 are smooth curved surfaces convex upward (Z direction).

Typical dimensions of respective parts in the battery module 1 prototyped by the inventors of this application are: a width Da of the stripe-shaped pattern elements 121 is about 170 μm and a height Ha thereof is about 100 μm. A distance S between the adjacent stripe-shaped pattern elements 121, 121 is about 160 μm. A thickness Hd of the solid electrolyte layer 13 is about 200 μm.

A "contact angle" denoted by θ in FIG. 4 at a "contact point" P where the negative-electrode current collector 11, the stripe-shaped pattern element 121 made of the negative-electrode active material and the solid electrolyte layer 13 are in contact is smaller than 90°. In this specification, the contact point P means a position where the stripe-shaped pattern element 121 stands up from the negative-electrode current collector 11. Further, the contact angle θ means a gradient of the surface of the stripe-shaped pattern element 121 at the contact point P, i.e. an angle at a side including the stripe-shaped pattern element 121 out of angles formed between a tangent drawn to the stripe-shaped pattern element 121 at the contact point P and the negative-electrode current collector 11.

As a result of various experiments, the inventors of this application found that the battery could have good characteristics if the negative-electrode active material layer 12 was formed by the stripe-shaped pattern elements 121 formed such that this contact angle θ was smaller than 90° (about 60° in this example). Specifically, the inventors of this application succeeded in manufacturing a battery, which had both good charge and discharge characteristics and a high capacity at normal temperature (30° C.), for the first time. Any of actual measurement results disclosed below was obtained from the measurement at ambient temperature (30° C.).

A prototyped battery module 1 uses a copper foil as the negative-electrode current collector 11, a material mainly containing $Li_4Ti_5O_{12}$ as the negative-electrode active material layer 12, a polymer material (polyethylene oxide and polystyrene) containing $LiPF_6$ as a supporting salt as the solid electrolyte layer 13, a material mainly containing $LiCoO_2$ as the positive-electrode active material layer 14 and an aluminum foil as the positive-electrode current collector 15, respectively.

Figure 5A:
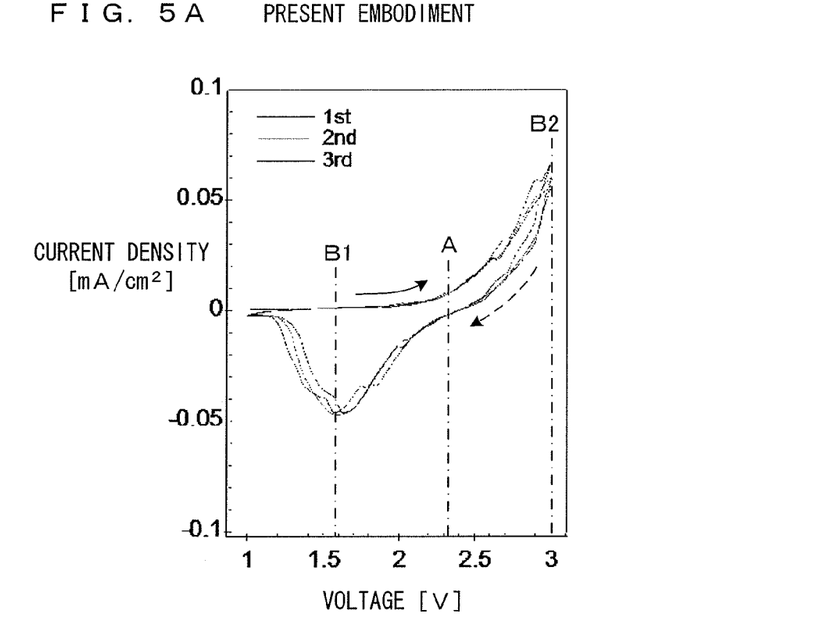
FIGS. 5A, 5B, 6A and 6B are graphs which show actual measurement data on properties of the battery of this embodiment.
Figure 5B:
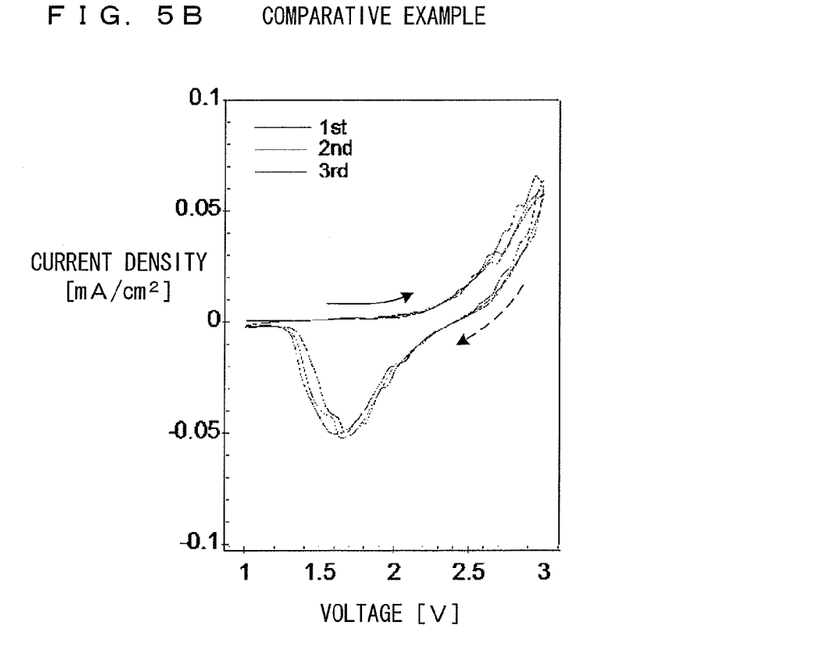

FIGS. 5A and 5B show cyclic voltammograms actually measured in the prototyped battery module 1. More specifically, FIG. 5A shows actual measurement results (CV curves) in the battery module 1 of this embodiment having the above dimensions. FIG. 5B shows actual measurement results in a comparative example separately prepared. This comparative example has same composition as the embodiment but does not have a line-and-space structure as in the embodiment, and includes a negative-electrode active material film with a substantially uniform thickness formed on a surface of a negative-electrode current collector layer, wherein a film thickness thereof is about 43 μm.

Specifically, current density was measured while a voltage applied to the battery module was gradually reduced after being gradually increased. A maximum value of the applied voltage was 3 V, at which the battery is not theoretically destroyed. In FIGS. 5A and 5B and FIGS. 6A and 6B to be described later, a solid-line arrow indicates plotting when the applied voltage was increased, i.e. at the time of charging. On the other hand, a broken-line arrow indicates plotting when the applied voltage was reduced, i.e. at the time of discharging.

In cyclic voltammograms shown in FIGS. 5A and 5B, there is no big difference between the battery module of this embodiment and the comparative example. In other words, as shown by a dashed-dotted line A in FIG. 5A, the rise of a curve at the time of charging (solid-line arrow) and the fall of a curve at the time of discharging (broken-line arrow) are seen when the applied voltage is in the neighborhood of about 2.35 V. This is equivalent to an electromotive force in this battery module. Note that if the rise of the curve and the fall of the curve can be confirmed at median values of the potentials respectively shown by imaginary lines B1, B2, i.e. the positions of half wave potentials, potentials at that time may be electromotive forces. In the result this time, the value obtained in this way also substantially coincides with the above value (2.35 V).

The obtained value 2.35 V of the electromotive force coincides with a theoretical electromotive force obtained from a combination of the positive-electrode active material (LCO) and the negative-electrode active material (LTO). It can be confirmed from FIG. 5A that the battery module 1 of this embodiment generates an electromotive force equal to a theoretical value.

Obtained current densities were substantially the same in this embodiment and the comparative example. However, the used amount of a negative-electrode active material (LTO) is 10.26 mg/cm$^2$ in the comparative example while being 4.08 mg/cm$^2$, i.e. about 40%, in this embodiment employing the line-and-space structure. Accordingly, in terms of use efficiency of the negative-electrode active material, this embodiment can be said to be about 2.5 times higher than the comparative example. This means that the used amount of an active material necessary to obtain the same theoretical current density can be much less in batteries having the structure of this embodiment. No meaningful difference was seen in measurements repeated a plurality of times (three measurement results are respectively denoted by "1st", "2nd" and "3rd" in FIGS. 5A and 5B).

Figure 6A:
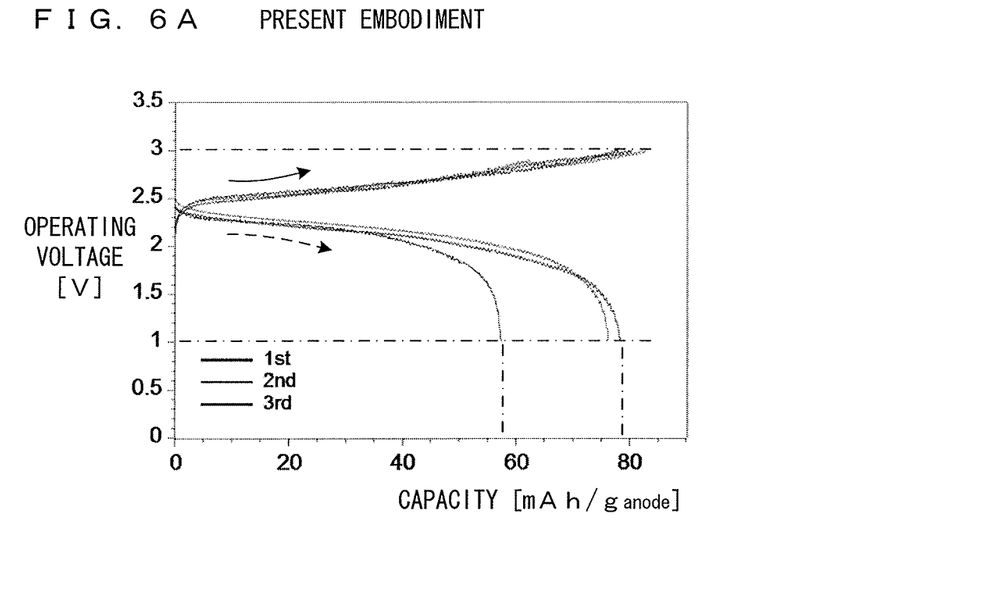
Figure 6B:
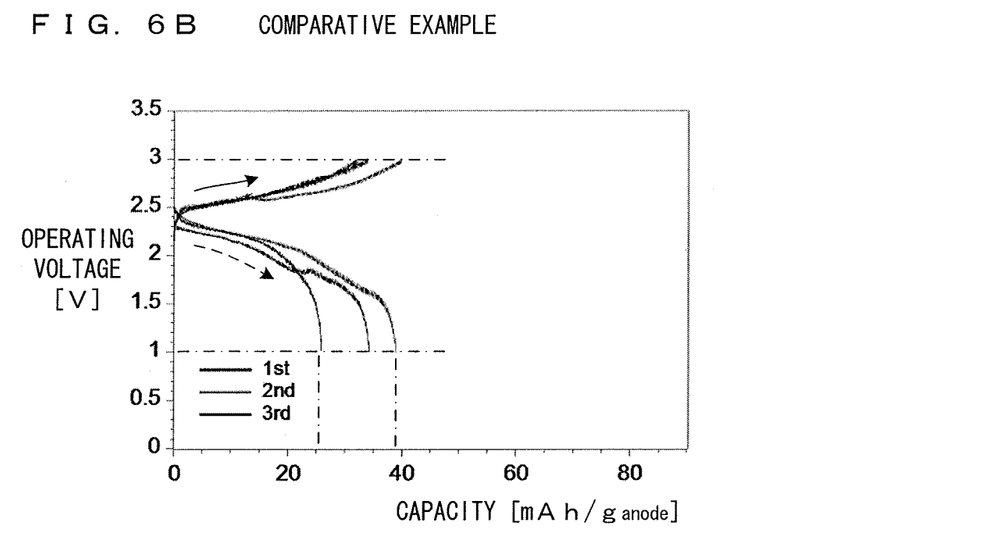
Figure 7A:
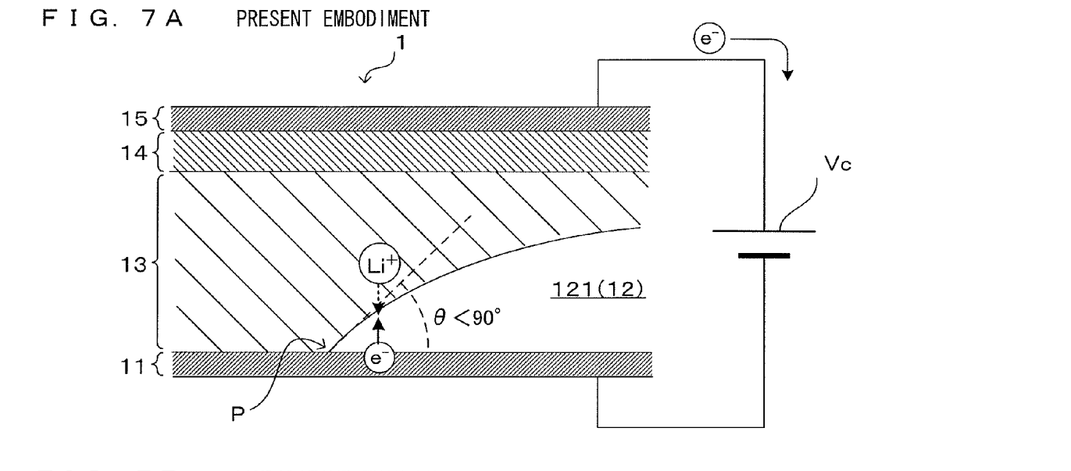
FIGS. 7A, 7B and 7C are drawings which diagrammatically show a difference between the structure of the battery according to the invention and that of a conventional battery module.
Figure 7B:
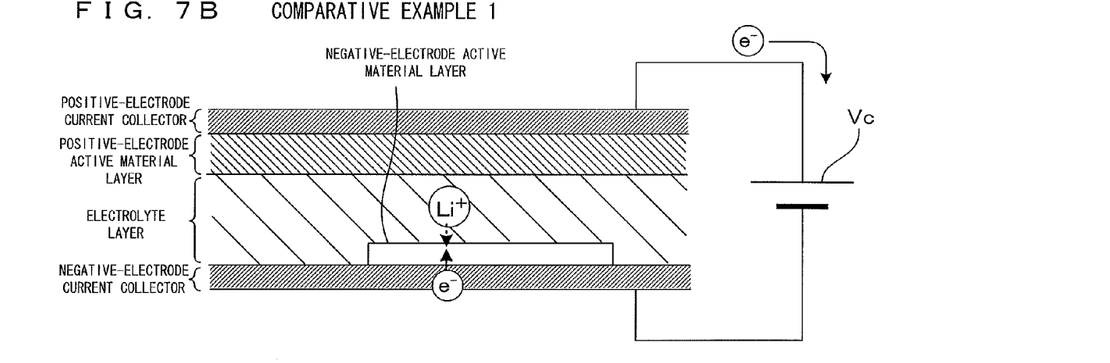
Figure 7C:
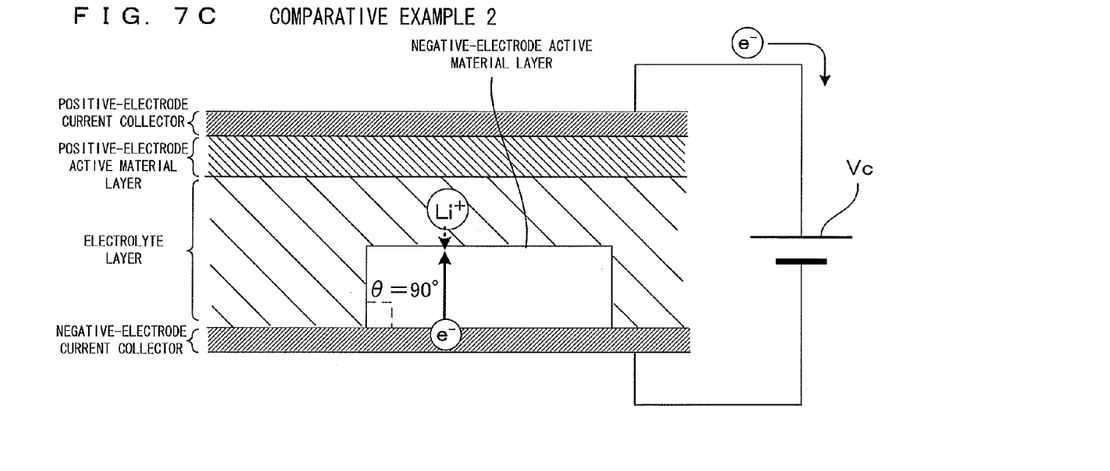

FIGS. 6A and 6B show charge and discharge characteristics, wherein FIG. 6A shows an actual measurement result in this embodiment and FIG. 6B shows an actual measurement result in the same comparative example as above. A current having a constant current density was applied to the battery from a current source and a change in an operating voltage of the battery was measured. At the time of a charging operation during which the current was applied, the operating voltage increased with time. When the operating voltage of the battery reached 3 V, a direction of the current was reversed. The operating voltage started decreasing and measurement was carried out until the operating voltage was reduced to 1 V. For charge and discharge capacity, a time from the start of the discharge until the operating voltage reached 1 V was multiplied by the current density, and this product was divided by the used amount of the active materials to obtain capacity per gram of the used active materials. The capacity was about 25 mAh to 40 mAh even at a 0.1 C rate in the comparative example shown in FIG. 6B, whereas the capacity as high as about 60 mAh to 80 mAh at even a 0.3 C rate, which is a more severe rate, was obtained in this embodiment shown in FIG. 6A.

As described above, it was confirmed that the lithium-ion secondary battery module 1 of this embodiment had both a high capacity and good charge and discharge characteristics.

According to the knowledge of the inventors of this application, preferred ranges of the dimensions of the respective parts that provide good battery properties are generally as follows. Specifically, it is preferable that the width Da of the stripe-shaped pattern elements 121 is 20 μm to 300 μm, the height Ha thereof is about 10 μm to 300 μm and an aspect ratio of cross sections thereof, i.e. a ratio of the height Ha to the width Da is equal to or larger than 0.5.

The inventors of this application thought as follows for the reason why the battery of this embodiment displayed good properties. A case is considered where, as shown in FIG. 7A, an external direct-current power supply Vc is connected to the lithium-ion secondary battery module 1 of this embodiment and a higher potential is given to the positive-electrode current collector 15 than to the negative-electrode current collector 11. This state is equivalent to a case where the lithium-ion secondary battery module 1 is charged by the external direct-current power supply Vc. At this time, lithium atoms in the positive-electrode active material layer 14 emit electrons (indicated by "e$^-$" in FIG. 7A) to become lithium ions (indicated by "Li$^+$" in FIG. 7A), which migrate in the solid electrolyte layer 13 and reach the negative-electrode active material layer 12 (stripe-shaped pattern elements 121). Then, these lithium ions are recombined with electrons supplied to the negative-electrode active material layer 12 via the negative-electrode current collector 11. By storing lithium atoms in the negative-electrode active material layer 12, the lithium-ion secondary battery module 1 is charged when viewed from the outside of the module.

In this embodiment, the contact angle θ at the contact point P is smaller than 90°. Thus, the thickness of the stripe-shaped pattern element 121 is very small at the contact point P. Particularly in this embodiment, the thickness is zero at the contact point P since the negative-electrode current collector 11 and the solid electrolyte layer 13 are in contact and increases with distance from the contact point P. Accordingly, the negative-electrode current collector 11 and the solid electrolyte layer 13 face each other with the very thin negative-electrode active material layer 12 therebetween near the contact points P. Thus, moving distances of lithium ions and electrons for recombination in the negative-electrode active material layer 12 can be very short. The same holds for a discharge in which lithium ions in the negative-electrode active material layer 12 conversely emit electrons. This is thought to contribute to an improvement in charge and discharge characteristics. On the other hand, since the negative-electrode active material layer 12 has a sufficient thickness in areas distant from the contact points P, many lithium atoms can be stored and a high capacity can be ensured. In this way, it is possible to combine good charge and discharge characteristics and a high capacity in the lithium-ion secondary battery module 1 of this embodiment.

It is thought to be possible to obtain good charge and discharge characteristics also in the prior art battery described above by forming the negative-electrode active material layer very thin, for example, as shown in FIG. 7B. However, with such a construction, the amount of storable lithium atoms is limited and it is difficult to ensure a high capacity since the amount (volume) of the used negative-electrode active material is small. If the negative-electrode active material layer is thickened as shown in FIG. 7C, the capacity can be increased. However, if the contact angle θ is 90° or larger, moving distances of ions and electrons in the negative-electrode active material layer are longer, wherefore charge and discharge characteristics are poor.

Particularly in the case of forming the solid electrolyte layer by the application of the application liquid containing the electrolyte material, the application liquid may not reach contact points of the negative-electrode current collector and the negative-electrode active material well and clearances may be formed at the contact points P if the contact angle θ is equal to or larger than 90°. On the contrary, if the contact angle θ is below 90° as in this embodiment, the electrolyte material reliably reaches the contact points of the negative-electrode current collector and the negative-electrode active material. By this, the negative-electrode current collector, the negative-electrode active material and the solid electrolyte can be held in contact with each other at the contact points P, wherefore it is possible to obtain a battery with excellent properties as described above.

As described above, in this embodiment, in the lithium-ion secondary battery module 1 in which the negative-electrode current collector 11, the negative-electrode active material layer 12, the solid electrolyte layer 13, the positive-electrode active material layer 14 and the positive-electrode current collector 15 are successively laminated, $Li_4Ti_5O_{12}$ as main materials of the negative-electrode active material, polyethylene oxide and polystyrene as the solid electrolyte, and $LiCoO_2$ as the positive-electrode active material are respectively used. In addition, the negative-electrode active material layer 12 has the striped structure in which a plurality of stripe-shaped pattern elements 121 are arranged. The contact angle θ of the stripe-shaped pattern elements 121 with respect to the negative-electrode current collector 11 is set smaller than 90°. By such a structure, it is possible to construct a battery which operates at normal temperature and has a high capacity and good charge and discharge characteristics.

Here, the stripe-shaped pattern elements 121 constituting the negative-electrode active material layer 12 are formed by relatively moving the nozzle 31 for discharging the application liquid containing the negative-electrode active material with respect to the surface of the base material (negative-electrode current collector 11) in the Y-direction. By patterning by such a so-called nozzle-scan coating method, a multitude of stripe-shaped pattern elements parallel to each other can be formed in a short time with good controllability and minute patterns can also be formed. Thus, a battery with good and stable electrical properties can be manufactured with excellent productivity and at low cost.

By forming the surfaces of the stripe-shaped pattern elements 121 into smooth curve surfaces free from sharp edges, a degree of contact between a negative-electrode structure including the negative-electrode current collector 11 and the negative-electrode active material layer 12 and the solid electrolyte layer 13 can be increased. This makes interfaces of these less susceptible to damages such as peeling caused by bending of the battery module and enables the construction of a battery with stable properties. Thus, a bendable battery can be constructed and easily housed in containers of various shapes. Application by the nozzle-scan coating method described above is a method particularly suitable to form the stripe-shaped pattern elements 121 having the above cross-sectional shape.

Next, uses of the battery constructed as described above are described. Since the lithium-ion secondary battery module 1 of this embodiment has a high capacity and good charge and discharge characteristics at normal temperature, application to various devices is considered as illustrated below. Note that the following is an illustration of some of modes of various devices to which the battery of this embodiment is applicable, and the range of applications of the battery according to the invention is not limited to these.

Figure 8:
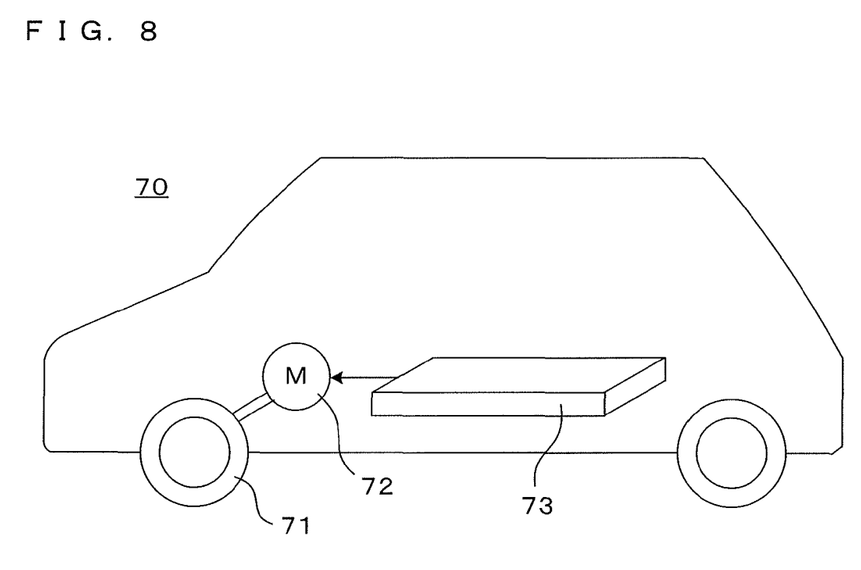
FIG. 8 is a drawing which diagrammatically shows a vehicle, specifically an electric vehicle as an example of the device mounted with the battery according to the invention.

FIG. 8 is a drawing which diagrammatically shows a vehicle, specifically an electric vehicle as an example of the device mounted with the battery according to the invention. This electric vehicle 70 includes wheels 71, a motor 72 for driving the wheels 71, and a battery 73 for supplying power to the motor 72. A multitude of lithium-ion secondary battery modules 1 connected in series and/or parallel to each other can be employed as this battery 73. Since the thus constructed battery 73 is small in size, has a high power supply capability and is rechargeable in a short time, it is suitable as a power supply for driving a vehicle such as the electric vehicle 70.

Figure 9:
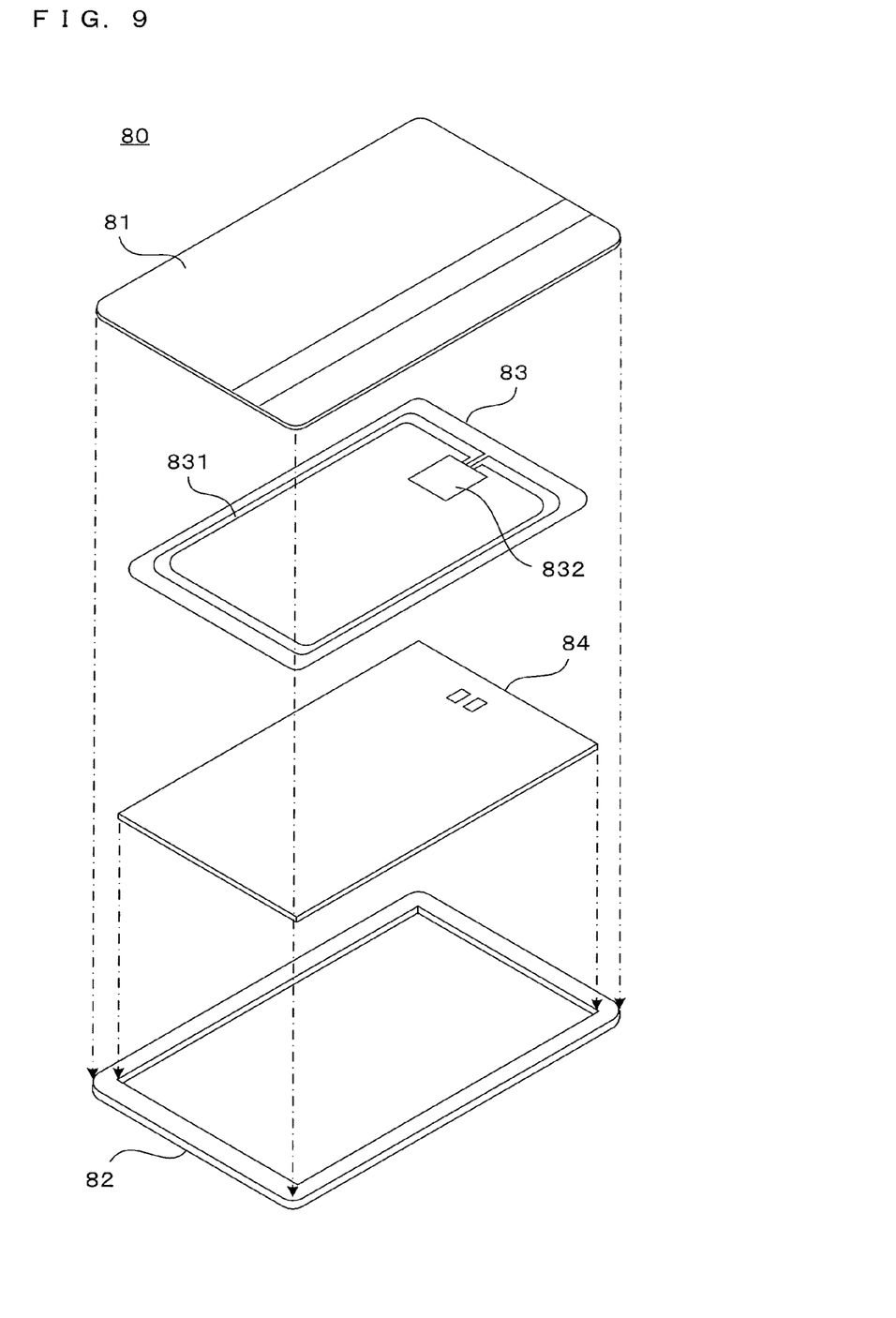
FIG. 9 is a drawing which diagrammatically shows an electronic device, specifically an IC card (smart card) as another example of the device mounted with the battery according to the invention.

FIG. 9 is a drawing which diagrammatically shows an electronic device, specifically an IC card (smart card) as another example of the device mounted with the battery according to the invention. This IC card 80 includes a pair of housings 81, 82 which constitute a card type package by being fitted together, a circuit module 83 to be housed in these housings and a battery 84 which serves as a power supply for the circuit module 83. Out of these, the circuit module 83 includes a loop antenna 831 for external communication and a circuit block 832 with an integrated circuit (IC) for performing data exchange with external devices via the antenna 831 and various calculation and storage processes. One set or a plurality of sets of lithium-ion secondary battery modules 1 described above may be used as the battery 84.

According to this construction, a communication distance with external devices can be more extended as compared with general IC cards including no power supply themselves and more complicated processes can be performed. Since the battery 84 according to the invention is small in size and thin and can ensure a high capacity, it can be suitably applied to such card type devices.

Besides the above, the battery according to the invention is applicable to machines such as electrically assisted bicycles, electric tools and robots, mobile devices such as personal computers, mobiles phones, mobile music players, digital cameras and video camera, and various electronic devices such as game machines, portable measurement devices and communication devices, and toys.

As described above, Steps S101 and S102 in the flow chart of FIG. 2 correspond to a "first step" of the invention, whereas Step S103 corresponds to a "second step" of the invention. Further, Step S104 corresponds to a "third step" of the invention. The nozzle 31 in this embodiment functions as a "nozzle" of the invention.

Further, the electric vehicle 70 in the above embodiment corresponds to a "vehicle" of the invention. The IC card 80 in the above embodiment corresponds to an "electronic device" of the invention, and the housings 81, 82 thereof function as a "housing" of the invention and the circuit module 83 thereof functions as an "electronic circuit unit" of the invention.

The invention is not limited to the above embodiment and various changes other than those described above can be made without departing from the gist of the invention. For example, in the above embodiment, the negative-electrode active material layer 12 is formed by the nozzle-scan coating method and the solid electrolyte layer is formed by the knife coating method or the bar coating method. However, the methods for forming the respective layers are not limited to these and known various application methods may be employed.

Although the battery is manufactured by bonding a separately formed laminated body composed of the positive-electrode active material layer and the positive-electrode current collector to a laminated body composed of the negative-electrode current collector, the negative-electrode active material layer and the solid electrolyte layer in the above embodiment, the invention is not limited to this. For example, the positive-electrode active material layer may be formed by applying an application liquid containing a positive-electrode active material to the laminated body composed of the negative-electrode current collector, the negative-electrode active material layer and the solid electrolyte layer and the positive-electrode current collector may be bonded to the thus formed laminated body.

In the battery of the invention, the negative-electrode current collector layer and the electrolyte layer may be in contact at contact points of the stripe-shaped pattern elements and the first current collector layer. In such a construction, the negative-electrode current collector layer and the electrolyte layer face each other with the very thin negative-electrode active material layer near the contact points, wherefore charge and discharge characteristics are particularly good.

In the battery of the invention, each stripe-shaped pattern element may be formed such that a width of a portion in contact with the negative-electrode current collector layer is 20 μm to 300 μm, a height is 10 μm to 300 μm and a ratio of the height to the width is equal to or larger than 0.5 in a cross-sectional shape of the stripe-shaped pattern element along a section orthogonal to an extending direction of the stripe-shaped pattern elements. According to an experiment by the inventors of this application, battery performances were particularly good when the negative-electrode active material layer was formed to have these dimensions.

In the battery of the invention, the electrolyte layer may include a solid electrolyte and the surfaces of the respective stripe-shaped pattern elements except the portions in contact with the negative-electrode current collector layer may be smooth curved surfaces. A battery including an electrolyte layer containing a solid electrolyte is easily handled since no electrolytic solution mainly containing an organic solvent is used. If the surfaces of the stripe-shaped pattern elements of the negative-electrode active material layer are smooth curved surfaces in this case, contact between the solid electrolyte layer and the negative-electrode active material layer can be increased and battery performances can be stable.

In the first step of the manufacturing method of the lithium-ion secondary battery according to the invention, the negative-electrode active material layer may be formed by applying an application liquid that contains an active material discharged from a nozzle to the surface of the base material. Further studies have been and are being made on such an application technology utilizing a so-called nozzle dispensing method and the negative-electrode active material layer having the striped structure described above can be formed with good controllability by appropriately adjusting the composition of the application liquid. Further, the application liquid may be applied in stripes on the surface of the base material by relatively moving the nozzle in a predetermined direction with respect to the surface of the base material. According to such a process, it is possible to form a pattern with stable line widths and height and stably manufacture a battery with good performances.

For example, in the second step, the solid electrolyte layer may be formed by applying an application liquid containing an electrolyte material on a surface of a laminated body formed by laminating the base material and the negative-electrode active material layer in the first step. Since angles formed between the stripe-shaped pattern elements and the negative-electrode current collector at contact points are smaller than 90° in this invention, the current collector layer, the active material layer and the electrolyte layer can be laminated without forming any clearances at the contact points by applying the application liquid containing the electrolyte material.

Since the lithium-ion secondary battery according to this invention has both a high capacity and good charge and discharge characteristics despite its small and thin size and also has excellent productivity, it can be suitably applied to battery-mounted vehicles and various electronic devices.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A lithium-ion secondary battery, comprising: a negative-electrode current collector layer; a negative-electrode active material layer containing $Li_4Ti_5O_{12}$ as an active material; a solid electrolyte layer containing polyethylene oxide and polystyrene; a positive-electrode active material layer containing $LiCoO_2$ as an active material; and a positive-electrode current collector layer, these being successively laminated, wherein, the negative-electrode active material layer has a striped structure made up of a plurality of pattern elements formed parallel to each other so that the pattern elements form stripes of the striped structure and arranged on a surface of the negative-electrode current collector layer while being spaced apart, and an angle at a side including the negative-electrode active material layer out of angles formed between the surface of the negative-electrode current collector layer and a tangent drawn to the negative-electrode active material layer at a contact point of each pattern element and the negative-electrode current collector layer is smaller than 90°.

2. The lithium-ion secondary battery according to claim 1, wherein the negative-electrode current collector layer and the solid electrolyte layer are in contact at the contact points of the pattern elements and the negative-electrode current collector layer.

3. The lithium-ion secondary battery according to claim 2, wherein a cross-sectional shape of each pattern element along a section orthogonal to an extending direction of the pattern elements is such that a width of a portion in contact with the negative-electrode current collector layer is 20 μm to 300 μm, a height is 10 μm to 300 μm and a ratio of the height to the width is equal to or larger than 0.5.

4. The lithium-ion secondary battery according to claim 1, wherein surfaces of the pattern elements except the portions in contact with the negative-electrode current collector layer are smooth curved surfaces.

5. A vehicle, comprising:
   a motor; and
   the lithium-ion secondary battery according to claim 1 for supplying power to the motor.

6. An electronic device, comprising:
   the lithium-ion secondary battery according to claim 1; and
   an electronic circuit unit which operates using the lithium-ion secondary battery as a power supply.

7. The electronic device according to claim 6, further comprising a card type housing for holding the lithium-ion secondary battery and the electronic circuit unit.

8. A manufacturing method of a lithium-ion secondary battery, comprising:
   a first step of forming a negative-electrode active material layer having a striped structure made up of a plurality of pattern elements containing $Li_4Ti_5O_{12}$ as a negative-electrode active material and parallel to and spaced apart from each other on a surface of a base material which will become a negative-electrode current collector layer, so that the pattern elements form stripes of the striped structure;
   a second step of forming a solid electrolyte layer which is made of a solid electrolyte containing polyethylene oxide and polystyrene and covers both surfaces of the negative-electrode active material layer and exposed surfaces of the base material not covered by the negative-electrode active material layer; and
   a third step of laminating a positive-electrode active material layer containing $LiCoO_2$ as a positive-electrode active material and a positive-electrode current collector layer on a surface of the solid electrolyte layer,
   wherein, in the first step, an angle at a side including the negative-electrode active material layer out of angles formed between the surface of the negative-electrode current collector layer and a tangent drawn to the negative-electrode active material layer at a contact point of each pattern element and the negative-electrode current collector layer is set smaller than 90°.

9. The manufacturing method of the lithium-ion secondary battery according to claim 8, wherein, in the first step, the negative-electrode active material layer is formed by applying an application liquid that contains the negative-electrode active material discharged from a nozzle to the surface of the base material.

10. The manufacturing method of the lithium-ion secondary battery according to claim 9, wherein, in the first step, the application liquid is applied in stripes on the surface of the base material by relatively moving the nozzle in a predetermined direction with respect to the surface of the base material.

11. The manufacturing method of the lithium-ion secondary battery according to claim 8, wherein, in the second step, the solid electrolyte layer is formed by applying an application liquid containing a material of the solid electrolyte on a surface of a laminated body formed by laminating the base material and the negative-electrode active material layer in the first step.

* * * * *